Feb. 22, 1949.  W. L. PARKER  2,462,544
VALVE ACTUATING MEANS

Original Filed June 3, 1942   2 Sheets-Sheet 1

INVENTOR.
WARDE L. PARKER
BY J E Deringer
His ATTORNEY

Feb. 22, 1949. W. L. PARKER 2,462,544
VALVE ACTUATING MEANS
Original Filed June 5, 1942 2 Sheets-Sheet 2
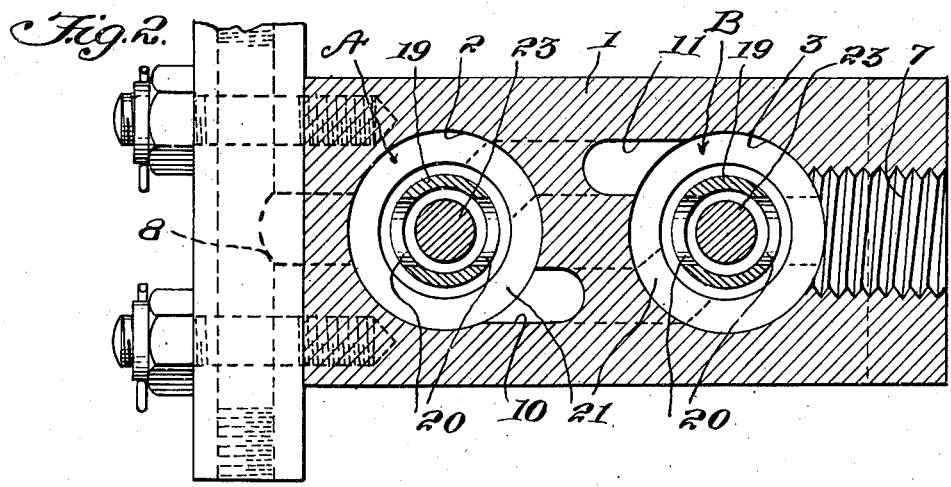
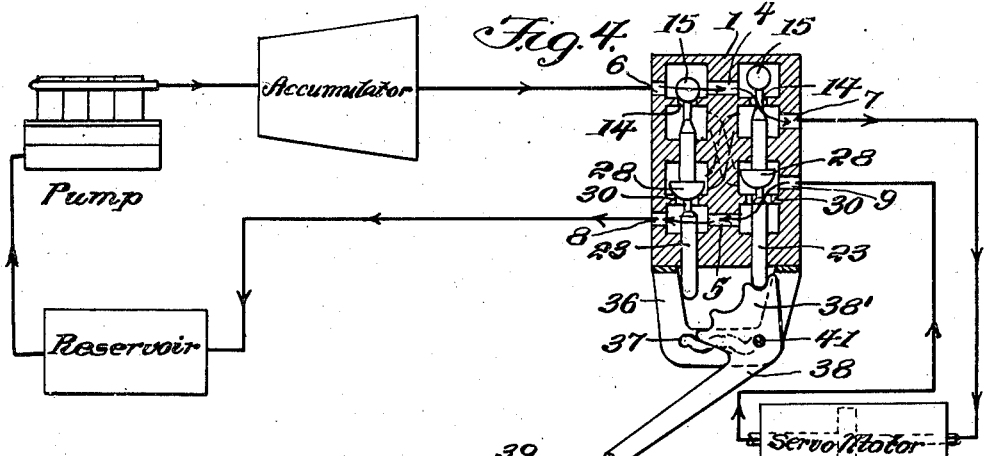
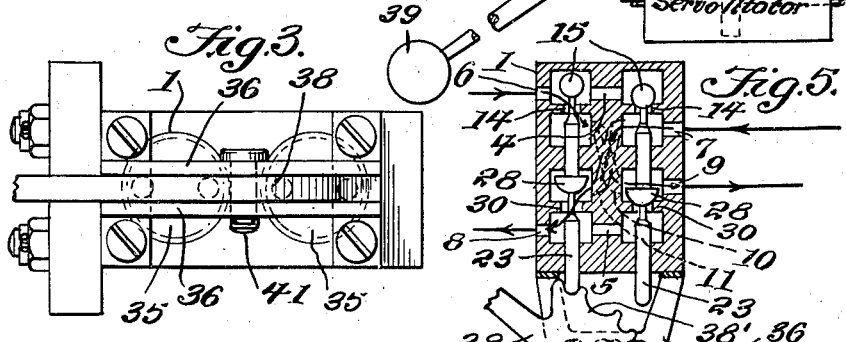
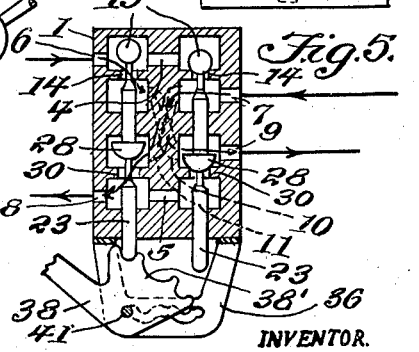
INVENTOR.
WARDE L. PARKER,
BY
HIS ATTORNEY Patented Feb. 22, 1949

2,462,544

UNITED STATES PATENT OFFICE 2,462,544

VALVE ACTUATING MEANS

Warde L. Parker, Los Angeles, Calif., assignor to United Aircraft Products, Inc., Dayton, Ohio, a corporation of Ohio Original application June 3, 1942, Serial No. 445,615. Divided and this application July 12, 1945, Serial No. 604,610

6 Claims. (Cl. 74—471)

This invention relates to a control valve and more particularly a valve of the multiple type.

The primary object of the invention is to provide an improved valve of the above character, wherein a single operating member controls the flow of fluid to and from a servomotor, which latter is provided with a single piston and oppositely disposed piston rods, that are employed to actuate various parts of airplanes, such as ailerons, rudders, etc., as is well known in the art.

A further object of the invention is to provide a multiple valve wherein the mechanism is extremely compact, and is attended with certainty of operation.

A further object of the invention is to provide a multiple valve for controlling the flow of fluid to and from a servomotor and for reversing the path of flow of such fluid.

A further object of the invention is to provide a valve of the above character which may be readily connected, or coupled, in series to thereby control a multiplicity of servomotors from a single operating station.

A still further object of the invention is to provide a valve of the above character which is of simple construction, and which may be economically manufactured.

The invention still further aims to provide novel means for selectively operating the valves by or from a single actuating member, and also by a conjoint bodily sliding and pivotal movement of the member, whereby to provide for positive and free actuation of the valve carrying stems.

Another objective of the invention is to provide a balanced valve structure, wherein the valve stems are effectively guided and tensioned.

Still further the invention aims to provide a valve structure which facilitates assemblage.

This application is a division of my application, Serial No. 445,615, filed June 3, 1942, for Control valves, upon which has been granted Patent No. 2,393,805, dated January 29, 1946.

The invention has still further and other objectives, which will later be set forth, and also of themselves manifested in the course of the following description.

In the drawings:

Figure 2 is a section on line 2—2 of Figure 1;

Figure 3 is a detail bottom plan view of Figure 1, the operating lever being broken away;

Figure 4 is a schematic view showing servomotor and associated devices, and the valve operating lever in one of its positions; and Figure 5 is a view similar but in fragment to Figure 4, showing the valve operating member in a second of its positions.

Figure 1:
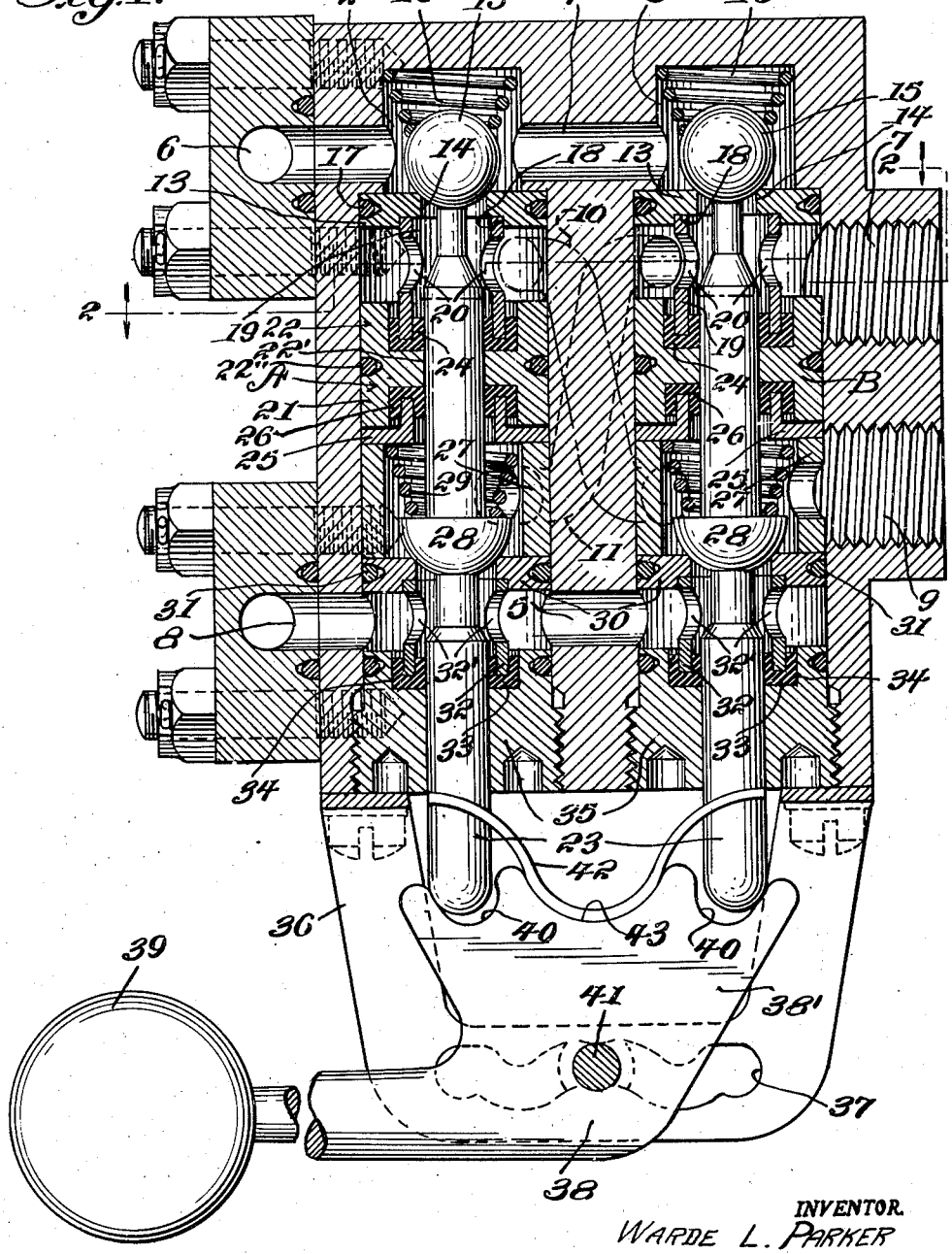
Figure 1 is a vertical sectional view of the invention, partly broken away, and with one of the bracket members for the operating lever omitted.

In proceeding in accordance with the present invention, a housing or casing 1 is provided and is formed with a pair of spaced and vertically or longitudinally disposed valve chambers 2 and 3.

The valve chambers 2 and 3 are connected at their upper ends by a horizontally extending fluid passage 4 and at their lower ends by a horizontally extending fluid passage 5. The upper passage 4 is provided at one end with a main inlet port 6 and at its opposite end with a combined outlet and return inlet port 7, while the lower passage 5 is provided at one end with a main outlet port 8 on the same side with and immediately below the main inlet port 6. The opposite end of the lower passage 5 is further provided with a secondary outlet and return inlet port 9.

The vertically disposed valve chambers 2 and 3 are further connected by a pair of non-communicating spaced cross passages 10 and 11, the upper end of the passage 10 communicating with the valve chamber 2 adjacent the upper end of the latter but below the passage 4, while its opposite end is connected to the chamber 3 adjacent the lower end thereof but above the passage 5.

The passage 11 has its upper end communicating with the upper end of chamber 3 below the passage 4, while the opposite end thereof is connected to the chamber 2 above but closely adjacent to the lower passage 5.

Disposed in the chambers 2 and 3 are valve assemblages, designated as A and B, respectively, which are duplicates of each other. A description of one therefore will suffice for both. It comprises a plate 13 which seats against a downwardly facing shoulder in the upper end of the related chamber, and is provided with an opening 14 with which cooperates a downwardly closing ball valve 15, the valve being normally held upon its seat by means of a coil spring 16 positioned between the valve and the upper end wall of the chamber.

The periphery of the plate 13 is grooved to receive a packing 17, which engages the wall of the chamber 2 so as to prevent the passage of fluid therebetween.

The lower face of the plate 13 is recessed at 18, to receive the upper edge of a tubular or sleeve-like spacer 19, the latter being formed with openings 20, to provide a passage for fluid between the cross passage 10, opening 14 and the upper horizontal passage 4. Below and spaced from the tubular member 19 is a cylinder 22 having intermediate its ends a partition 22' in which is a central opening which serves as a guide for a valve operating stem 23. The periphery of cylinder 22, is provided with packing 22''. The lower end of the tubular member 19 seats within a circular grooved packing 24 supported by the upper face of the partition 22'.

Beneath the cylinder 22 is a collar 25 having a central opening surrounded by an upwardly extending flange between which latter and the lower face of the partition 22' is interposed a packing 26, similar to packing 24.

Contacting the lower face of the collar 25 is a cylinder 27 of a length to provide a chamber in which a valve 28 formed integral with or rigidly affixed to, the stem 23, is free to move or reciprocate in a direction axially of the cylinder 27. A second coil spring 29 is disposed within this chamber between the collar 25, and valve 28 so as to urge the latter in a downward direction.

A ported plate 30 forming a seat for the valve 28, is disposed beneath and engages the lower end of the cylinder 27, and has its peripheral edge grooved to receive a packing 31 to prevent the passage of fluid in a manner similar to the first-named packing 17.

A sleeve-like spacer 32, which has a pair of opposed ports 32' formed therein, and alined with the lower horizontal passage 5, has its upper end engaging the lower face of plate 30 while its lower end is received within a grooved packing 33, the packing being disposed in a recess 34, of a screw threaded retaining plug 35, the latter acting to hold all of the aforementioned parts in assembled relation.

The plug 35 is formed with a central opening which receives and provides a supplemental guide for the valve stem 23, the latter having its lower end portion projecting beyond the lower face of the housing 1 for a purpose to be now described.

Secured to the lower face of the housing 1, and depending therefrom is a pair of spaced opposed U-shaped bracket members 36 the lower portion of each of which is formed with a double cam slot 37.

A bodily shiftable valve operating lever, or member 38 of substantially L-shape is disposed between the bracket members and is provided at one end with a hand engaging knob 39, while its opposite end is enlarged as indicated at 38', and formed with curved recesses or re-entrant portions, which provide seats 40 for the valve stems 23.

The member 38 is not only pivotally mounted by means of a pin 41, which is carried thereby, the ends of the pin being engaged with the walls defining the cam slots 37 so as to provide a fulcrum for the handle, but is also bodily shiftable along the lengths of the slots.

A leaf spring 42 of substantially U-shape is disposed between the bracket members and has its bight portion seated in a corresponding U-shaped recess 43 formed in the enlarged end 38' of the member 38, so as to be supported thereby. The spring acts to prevent undue play or motion between the handle and valve stems 23, when member 38 is rocked to actuate either of the valve stems. When the member 38 is bodily shifted and rocked, the pin 41 thereof rides in the slots 37, in a direction toward the valve stem 23 which is to be operated, so that the force exerted by the enlarged end 38' of the valve operating member 38 will be in a straight line acting against the valve stems. Thus if the valve stem 23 to the right of Figure 4, is to be actuated, the member 38 is shifted to the right of Figure 1, so that the pin will engage the adjacent ends of the slots 37, and upon downward rocking of member 38, force exerted against the valve stem 23 will be in a straight line, and the latter will thus not be subjected to any binding action.

Similarly, if the valve stem 23 to the left of Figures 4 and 5 is to be actuated the lever 38 is shifted to the left but rocked in an upward direction as shown in Figure 5. It will thus be seen that the lever is not only bodily shifted but also rocked in reverse directions according to which of the valve stems 23 is to be actuated.

In operation:

Assuming the piston of the servomotor is disposed substantially midway of the cylinder, and all of the valves are closed as shown in Figure 1, the lever 38 is moved downwardly to the position shown in Figure 4. This action causes shifting of the pin 41 toward the right end of the cam slot 37, resulting in vertical movement of the valve stem 23 to open the valves 15 and 28 disposed at the right of Figure 4.

The actuating fluid from the accumulator is thereby permitted to pass through inlet port 6, horizontal passage 4, and outlet 7 to the right side of the piston, the fluid in the line to the left of the piston of the servomotor being simultaneously exhausted through port 9, horizontal passage 5, and outlet port 8 to a reservoir, as shown in Figure 4.

If it is desired to move the piston of the servomotor toward the right of Figure 4, the lever 38 is moved in an upward direction. This action causes pin 41 to shift the lever to the left and then engage and actuate the valve stem 23, and open valves 15 and 28 at the left of Figure 4, while the valves 15 and 28 to the right of Figure 4 will be closed under the influence of the springs 16 and 29. With the valves in the position just described, and also shown in Figure 5, the actuating fluid passes through inlet port 6, thence downwardly past valve 14, through cross passage 10, and thence to the left side of the servomotor piston through the outlet port 9. The fluid is exhausted from the right side of the piston by flowing through the port 7, cross passage 11, thence outwardly through the exhaust port 8 to the reservoir.

From the foregoing it will be seen that a simple, compact structure is provided and wherein there is but a single inlet 6 and a single outlet 8 for the passage of the actuating fluid regardless of the position of the actuating lever.

It is to be understood that the form of the invention herein shown and described is to be taken as a preferred sample of the invention, and that various changes in the shape, size and arrangement of parts may be resorted to without departing from the spirit of the invention or the scope of the subjoined claims.

What is claimed is:

1. Means for selectively operating a pair of slidable valve stems each having a free end, including an actuating member formed with a pair of curved seats for movably receiving the free ends of the valve stems therein, means to mount the member for pivotal movement in opposite directions and for bodily movement to selectively position its seats with respect to the valve stems, said member having a spring-receiving seat between its valve stem engaging seats, and a leaf spring in said spring-receiving seat.

2. Means for alternatively operating a pair of valves having stems extending in spaced relation toward cooperation with said means, said valve operating means comprising a stationary support, an actuating member having a pin in slot connection with said support, said connection providing a movable fulcrum for said member, said member being shiftable bodily relative to said support by reason of said pin in slot connection to place said fulcrum alternatively in line with said valve stems, and seats on said actuating member for engagement with said valve stems.

3. Means according to claim 2, characterized by spring means urging said actuating member yieldingly to an intermediate position wherein said fulcrum is between said valve members.

4. Means for alternatively operating a pair of valves having stems extending in spaced relation toward cooperation with said means, said valve operating means comprising a stationary support, a slot in said support, the ends of said slot terminating in positions respectively in line with said valve stems, an actuating member formed with portions for cooperative engagement with said valve stems, a pin on said actuating member extending into said slot and providing in conjunction with said slot a movable fulcrum for said member, spring means yieldingly holding said actuating member in a position wherein said fulcrum is intermediate the ends of said slot, said member being shiftable bodily longitudinally of said slot to place said fulcrum alternatively in line with said valve stems, said member being rotatable about said fulcrum to operate said stems.

5. Means according to claim 4, characterized in that a surface of said actuating member is formed with spaced seats complementing the ends of said valve stems, said seats constituting said portions for cooperation with said stems, said surface being further formed with a recessed portion intermediate said seats receiving said spring, said spring being of the leaf type.

6. Means for alternatively operating a pair of valves having stems extending in spaced relation toward cooperation with said means, said valve operating means comprising a support, an actuating member having a pin in slot connection with said support, said connection providing a movable fulcrum for said member, said pin in slot connection further being constructed and arranged with respect to said valve stems as to permit said fulcrum to be moved alternatively into positions in line with said stems by bodily shifting said member, and portions on said actuating member brought by such movement into cooperative engagement with said valve stems, said actuating member being shiftable and rotatable in one sense to operate one of said valve stems and being shiftable and rotatable in an opposed sense to operate the other of said valve stems.

WARDE L. PARKER.

REFERENCES CITED

The following references are of record in the file of this patent:

UNITED STATES PATENTS

| Number | Name | Date |
| --- | --- | --- |
| 2,144,616 | Carlson | Jan. 24, 1939 |
| 2,205,300 | Marsh | June 18, 1940 |
| 2,387,008 | Buchanan | Oct. 16, 1945 |

FOREIGN PATENTS

| Number | Country | Date |
| --- | --- | --- |
| 168,241 | Great Britain | Sept. 1, 1921 |